(No Model.)  6 Sheets—Sheet 1.

O. R. CHAPLIN.
SHOE NAILING MACHINE.

No. 343,363.  Patented June 8, 1886.

Witnesses:
Walter E. Lombard.
John McGrath.

Inventor:
Orril R. Chaplin,
by N. C. Lombard,
Attorney.

(No Model.)

6 Sheets—Sheet 2.

O. R. CHAPLIN.
SHOE NAILING MACHINE.

No. 343,363. Patented June 8, 1886.

Witnesses:
W. E. Lombard
John McGrath

Inventor:
Orril R. Chaplin,
by N. C. Lombard
Attorney.

(No Model.) 6 Sheets—Sheet 4.
O. R. CHAPLIN.
SHOE NAILING MACHINE.
No. 343,363. Patented June 8, 1886.
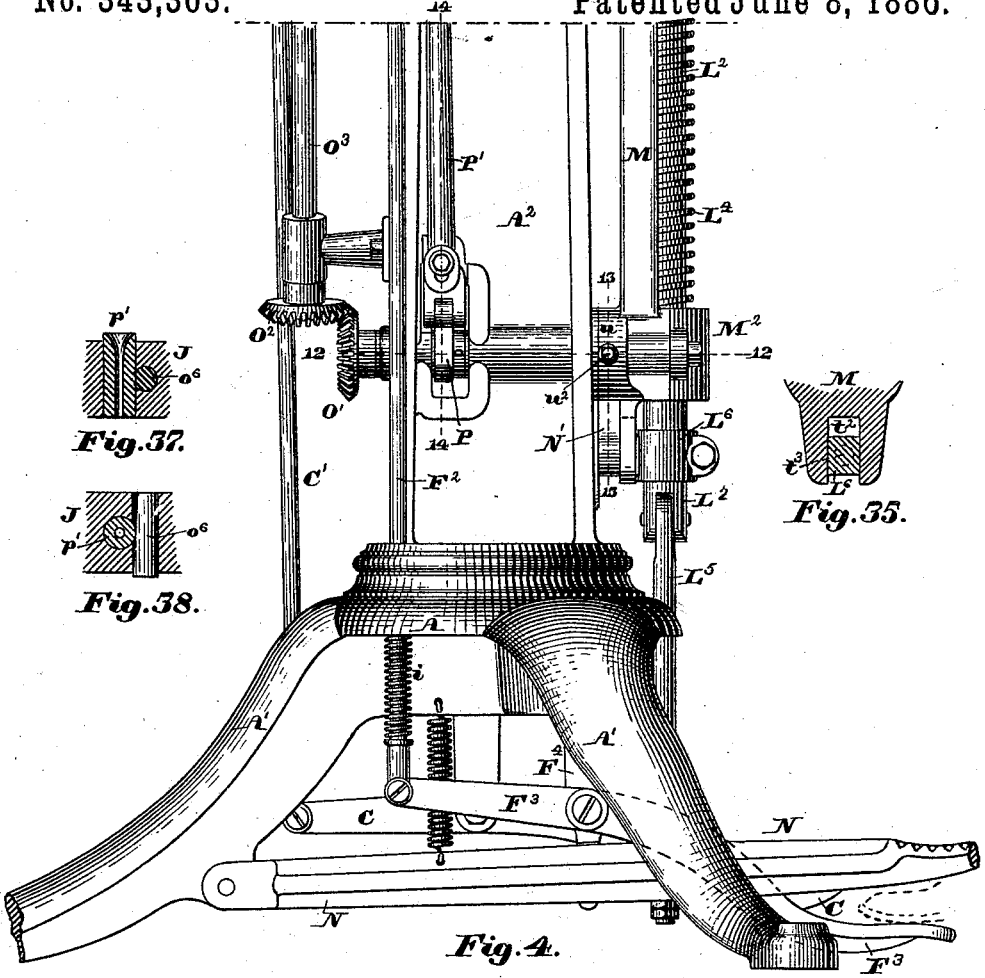
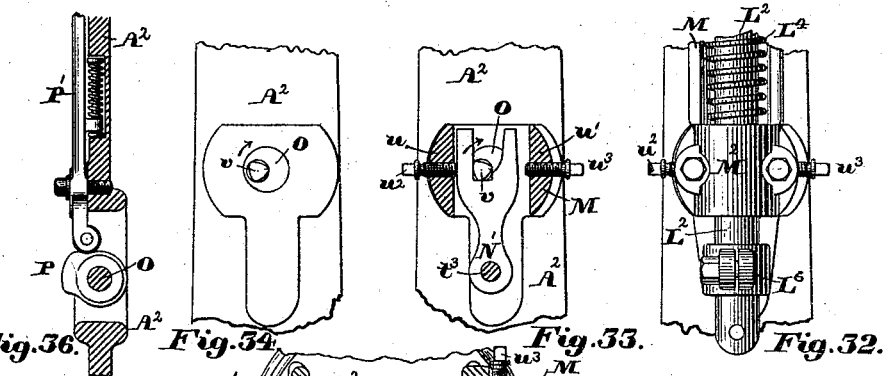
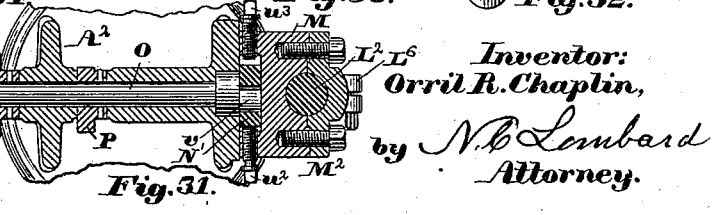
Witnesses:
Walter E. Lombard
John McGrath
Inventor:
Orril R. Chaplin,
by N. C. Lombard
Attorney.

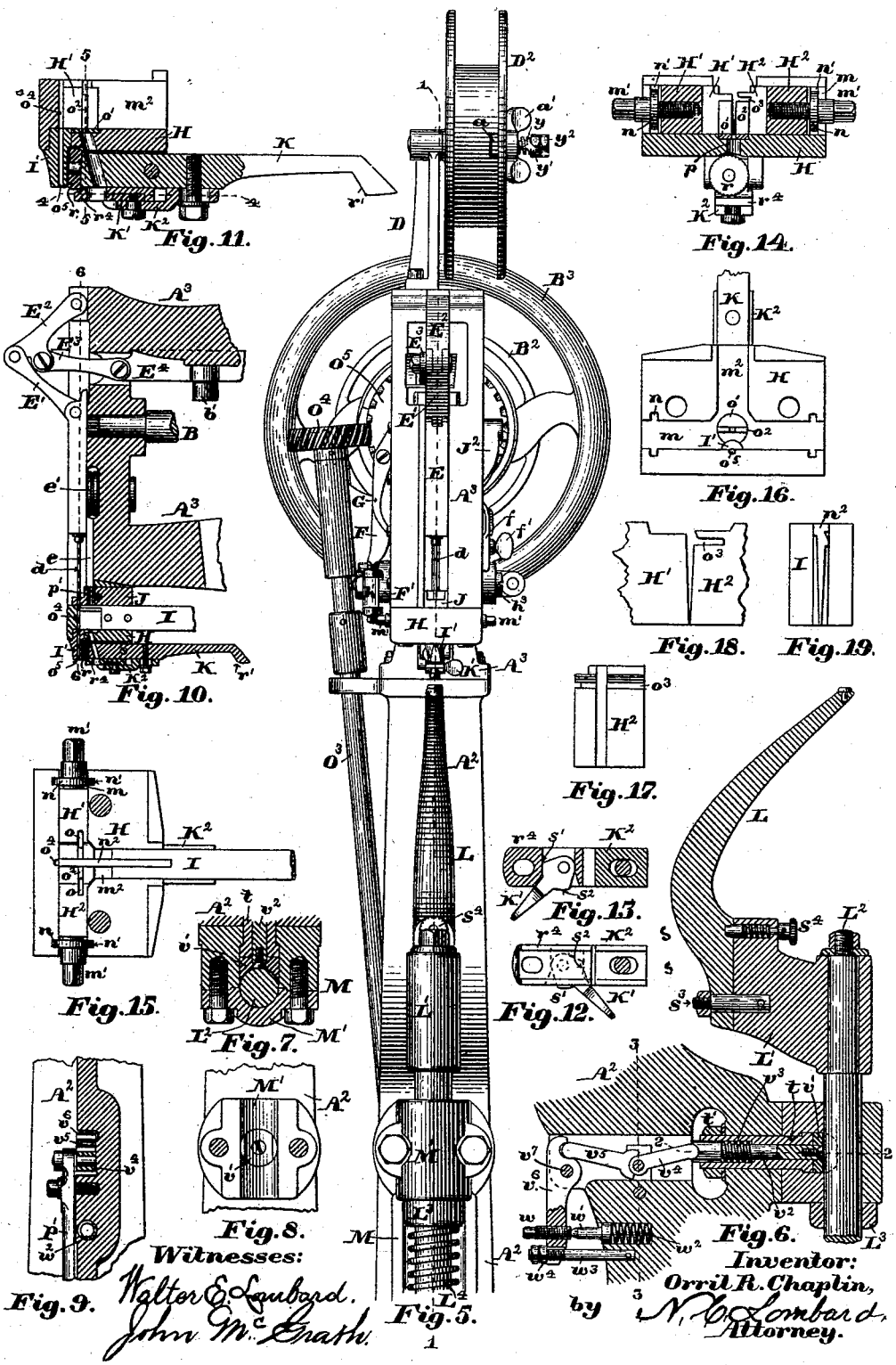

(No Model.) 6 Sheets—Sheet 6.
O. R. CHAPLIN.
SHOE NAILING MACHINE.
No. 343,363. Patented June 8, 1886.
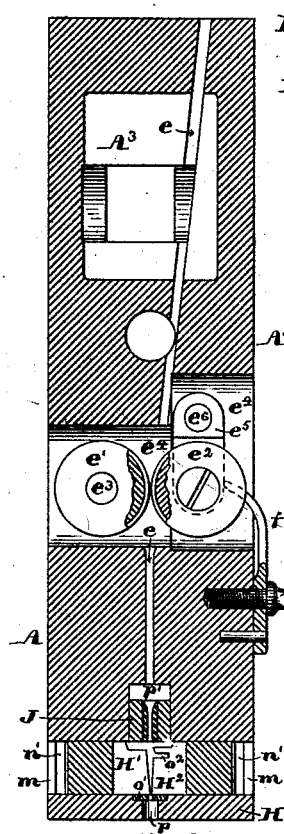
Fig. 20.
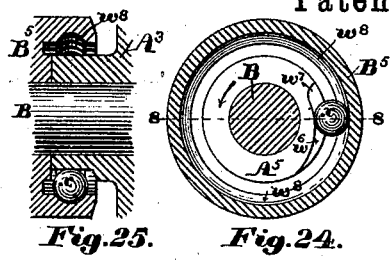
Fig. 25. Fig. 24.
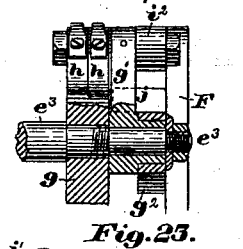
Fig. 23.
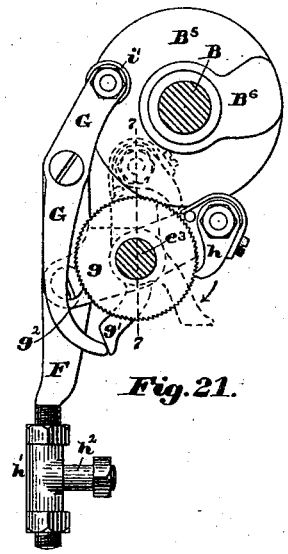
Fig. 21.
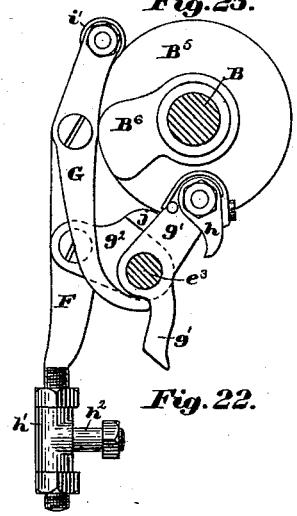
Fig. 22.
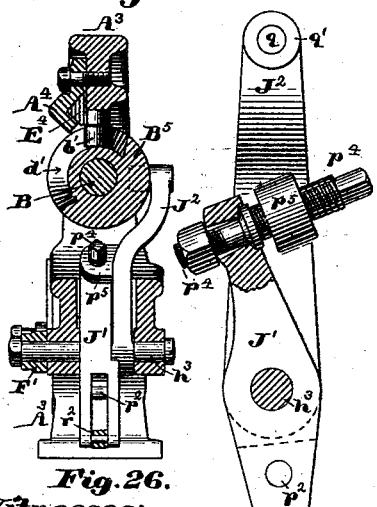
Fig. 26.
Fig. 27.
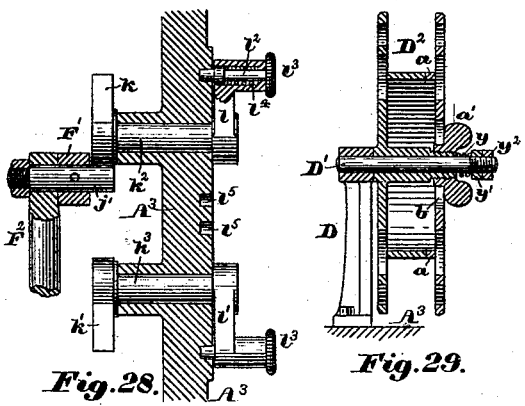
Fig. 28. Fig. 29.
Fig. 30.
Witnesses:
Walter E. Lombard,
John McGrath.
Inventor:
Orril R. Chaplin.
by N. C. Lombard,
Attorney.
N. PETERS, Photo-Lithographer, Washington, D. C.

UNITED STATES PATENT OFFICE.

ORRIL R. CHAPLIN, OF BOSTON, MASSACHUSETTS.

SHOE-NAILING MACHINE.

SPECIFICATION forming part of Letters Patent No. 343,363, dated June 8, 1886.

Application filed February 25, 1886. Serial No. 193,118. (No model.)

*To all whom it may concern:*

Be it known that I, ORRIL R. CHAPLIN, of Boston, in the county of Suffolk and State of Massachusetts, have invented certain new and useful Improvements in Shoe-Nailing Machines, of which the following, taken in connection with the accompanying drawings, is a specification.

My invention relates to that class of shoe-nailing machines which cuts the nails from a wire or rod and drives them into the sole of the shoe; and it consists in certain novel features of construction, arrangement, and combination of parts, which will be readily understood by reference to the description of the drawings, and to the claims to be hereinafter given.

Figure 1:
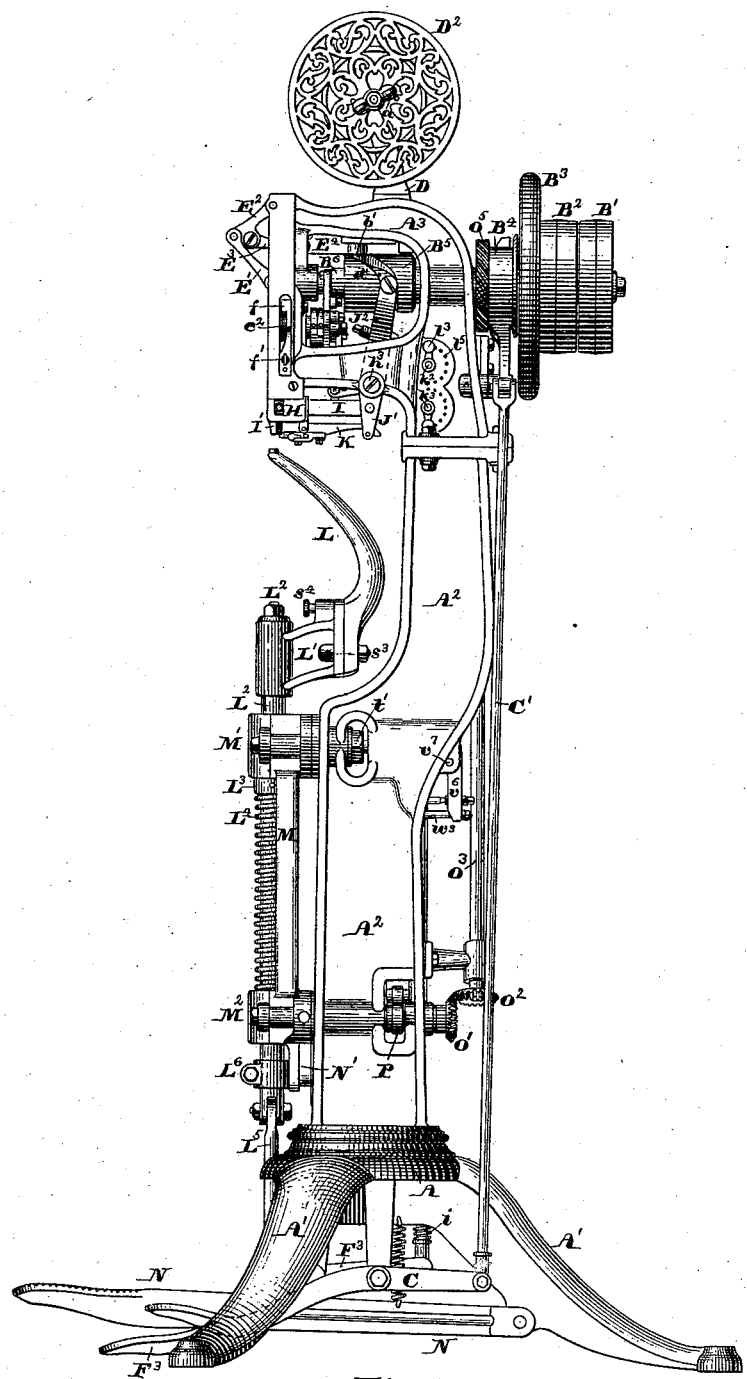
Figure 2:
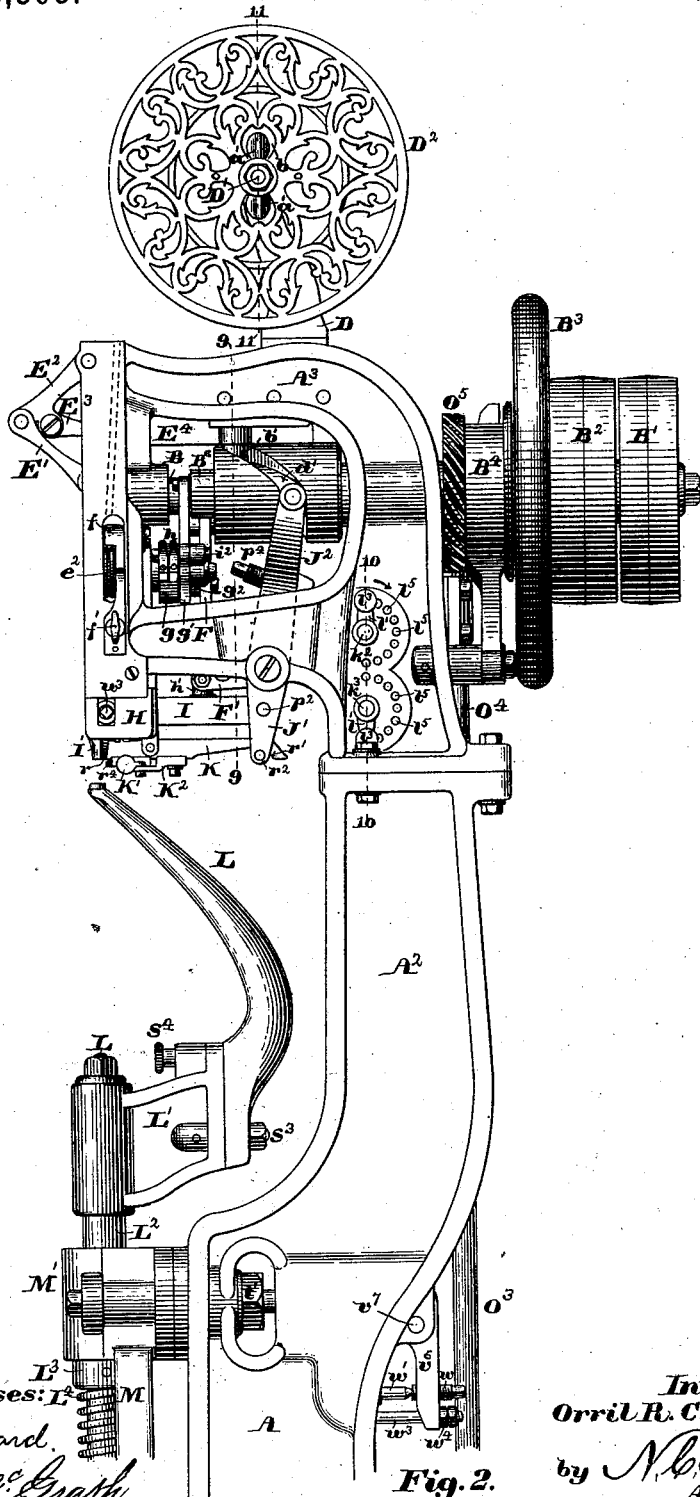
Figure 3:
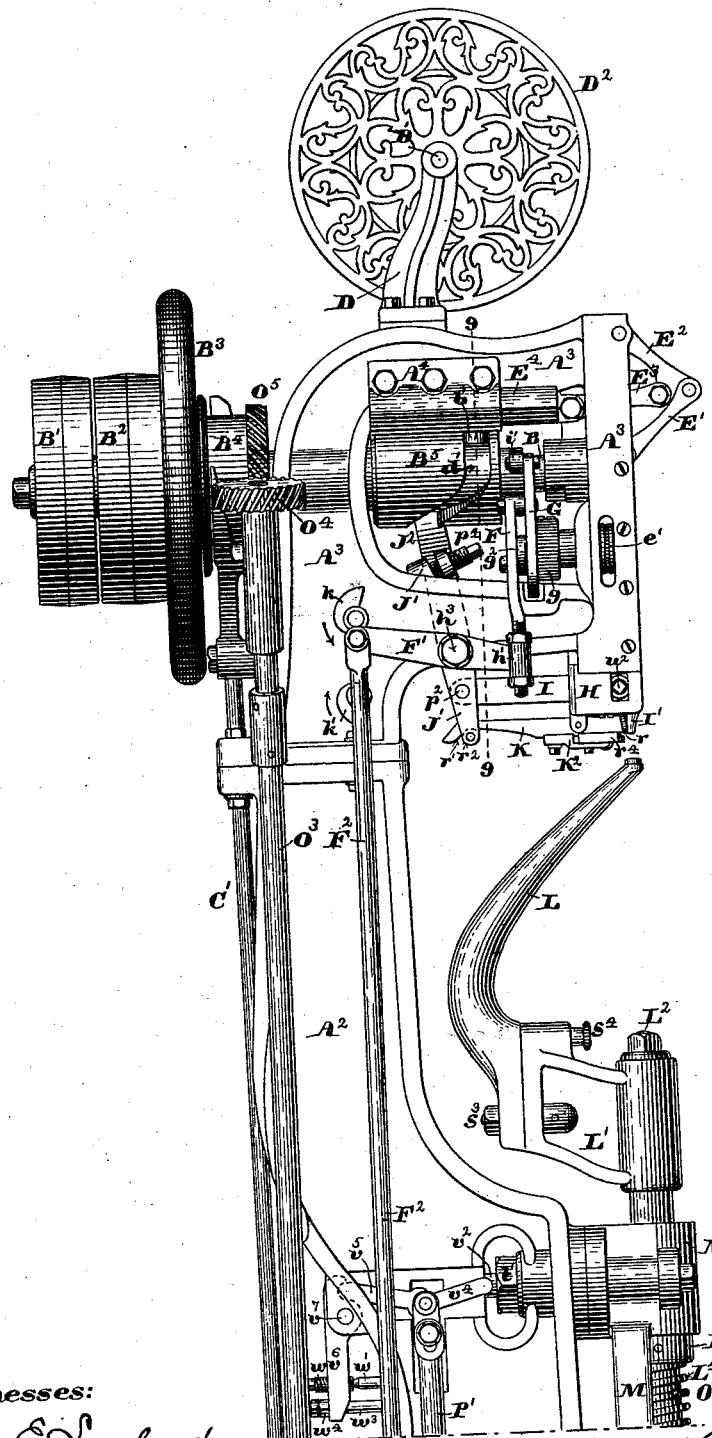

Figure 1 of the drawings is a side elevation of a complete machine embodying my invention. Fig. 2 is a similar side elevation of the upper portion of the machine, drawn to an enlarged scale. Fig. 3 is an elevation of the same portion of the machine, viewed from the opposite side to Fig. 2. Fig. 4 is a side elevation of the lower portions of the machine, viewed from the same standpoint as Fig. 3 and drawn to the same scale, a portion of one of the legs being broken away. Fig. 5 is a front elevation of the upper portions of the machine. Fig. 6 is a vertical section through the shoe-supporting horn, its upper bearing, and a portion of the column or standard, and showing a portion of the mechanism for clamping the horn in a fixed position, the cutting-plane being on line 1 1 on Fig. 5. Fig. 7 is a partial horizontal section on line 2 2 on Fig. 6. Fig. 8 is an elevation of the upper bearing for the horn-shaft with the cap removed. Fig. 9 is a vertical section on line 3 3 on Fig. 6, looking toward the left of said figure. Fig. 10 is a vertical section through the front portion of the head of the machine on line 1 1 on Fig. 5, with the reel and its stand removed. Fig. 11 is a similar view of the lower portion of Fig. 10 enlarged, with the male cutting die and plunger removed. Fig. 12 is a plan of the gage, its operating-lever, and its supporting-plate. Fig. 13 is a sectional plan of the same, the cutting-plane being on line 4 4 on Fig. 11. Fig. 14 is a vertical section on line 5 5 on Fig. 11. Fig. 15 is a plan of the parts shown in Fig. 11, with the male die and its carrier or plunger in position after having cut the nail and fed it beneath the driver. Fig. 16 is a plan of the die-holder with the dies removed. Fig. 17 is an elevation of the inner end of one of the stationary dies for shaping the sides of the nail. Fig. 18 is a front elevation of the inner portions of the two stationary cutting-dies. Fig. 19 is an end view of the male cutting-die or punch with its carrier or plunger. Fig. 20 is a vertical section of the front portion of the head on line 6 6 on Fig. 10, drawn to an enlarged scale. Fig. 21 is an elevation of the wire-feeding mechanism, looking toward the rear of the machine, with the cam and feed shafts cut in section, the parts being adjusted for feeding the wire for the longest nail and in the position they assume at the completion of the feeding of the wire. Fig. 22 is a similar view of the same parts, except the ratchet-wheel, which is cut away, adjusted for feeding the wire for the shortest nail and in the position for commencing to feed the wire. Fig. 23 is a section through a portion of the ratchet-wheel and contiguous parts on line 7 7 on Fig. 21, with the parts in the position for commencing to feed the wire, as indicated in dotted lines in said Fig. 21. Fig. 24 is a transverse section through the cam-shaft and the rear portion of the driver-operating cam, and showing the ball-stop for preventing the cam-shaft being revolved in the wrong direction. Fig. 25 is a section on line 8 8 on Fig. 24. Fig. 26 is a vertical section on line 9 9 on Figs. 2 and 3, and showing the lever for operating the nail-cutting plunger and die in elevation. Fig. 27 is a side elevation of the die-plunger-operating lever drawn to an enlarged scale. Fig. 28 is a section on line 10 10 on Fig. 2, illustrating the devices for adjusting the feed of the wire. Fig. 29 is a section of the wire-carrying reel on line 11 11 on Fig. 2. Fig. 30 is an elevation of the central portion of the removable head of the reel detached from the body thereof. Fig. 31 is a horizontal section on line 12 12 on Fig. 4. Fig. 32 is a front elevation of the lower portion of the horn-carrying spindle and its lower bearing. Fig. 33 is a section on line 13 13 on Fig. 4, looking toward the standard or column. Fig. 34 is a front elevation of a portion of the column or standard, with the horn-carrying frame and its accessories removed. Fig. 35 is a vertical section of the lower portion of the horn-carrying frame and the rectangular hub of the clamping-collar on the horn-support. Fig. 36 is a vertical section of a portion of the column on line 14 14 on Fig. 4; and Figs. 37 and 38 are respectively a vertical section and a horizontal section through the tubular nail-severing die, drawn to an enlarged scale.

In the drawings, A is the base of the machine, provided with three legs, A', and having bolted thereto the standard or column $A^2$, to the upper end of which is bolted the frame $A^3$ of the head of the machine, all as shown in Fig. 1.

B is the driving-shaft, mounted in bearings in the frame $A^3$, and having mounted thereon the pulleys B' $B^2$, the fly-wheel $B^3$, a clutch mechanism, $B^4$, and the cams $B^5$ and $B^6$, as shown in Figs. 2 and 3. The fly-wheel $B^3$ and the pulley $B^2$ are cast in one piece and mounted loosely upon the shaft B, to which it may be secured, so as to compel said shaft to revolve therewith by the operation of the clutch mechanism, which is preferably of the kind patented to me May 8, 1883, No. 277,002, and need not be further described here, except that it is operated by means of the treadle C and connecting-rod C', as shown in Fig. 1.

To the upper edge of the frame $A^3$ is bolted the stand D, having set in its upper end the spindle D', upon which is mounted the wire-carrying reel or drum $D^2$, the barrel, one head, and the central hub of which are cast in one piece, the other head being cast separate and provided with a lug, $a$, upon its inner face, which fits into a notch in the edge of the barrel, to register said head and prevent it revolving upon the hub of the button or thumb-nut $a'$, which fits the central portion of the oblong opening $b$ at the center of said removable head, (shown in Fig. 30,) said button $a'$ being provided with a female screw-thread, to fit a corresponding male thread on the end of the hub of the reel, as shown in Fig. 29, and being so shaped and arranged that if it is turned to the position shown in Fig. 1 its wings will press upon the head $D^3$ and hold it firmly in position, but if turned from said position a quarter-turn or a little less, to the position shown in Figs. 2, 5, and 29, the head $D^3$ can be removed without the button or thumb-nut $a'$ being removed or further unscrewed.

In the front edge of the frame $A^3$ is formed a dovetailed guideway to receive the vertically-reciprocating plunger E, in the lower end of which is set the steel driver $d$, and to the upper end of which is pivoted one end of the toggle-link E', the opposite end of which is in turn pivoted to one end of the link $E^2$, the opposite end of which is pivoted to the upper portion of the frame $A^3$, said link $E^2$ also having pivoted thereto, near its lower end, one end of the link $E^3$, the opposite end of which is pivoted to the bar $E^4$, which is mounted in a bearing between the frame $A^3$ and the cap $A^4$, as shown in Fig. 3, said bar $E^4$ having mounted upon a stud set in the under side thereof an anti-friction roll, $b'$, which fits in the path $d'$ of the cam $B^5$ and is acted upon thereby to reciprocate said bar, and thus operate the driving-plunger E to drive the nail into the shoe.

In the rear of the driving-plunger E is formed in the frame $A^3$ a channel, $e$, for the passage of the wire from the reel $D^2$ to the cutting-dies, said wire passing between and being intermittently fed a distance equal to the desired length of nail to be driven by the feed-rolls $e'$ and $e^2$. The feed-roll $e'$ is firmly secured upon the front end of the feed-shaft $e^3$, mounted in a bearing in the rear portion of the front vertical bar of the frame $A^3$, which bar has formed therein the slot $e^4$, in which work the feed-rolls $e'$ and $e^2$, as shown in Figs. 2, 3, and 20. The feed-roll $e^2$ is mounted upon a stud set in the free end of the pendent arm $e^5$, pivoted to the frame $A^2$ at $e^6$, and is pressed toward the roll $e'$ by the spring $f$, secured to the side of the frame $A^3$ below the slot $e^4$, the tension of which may be regulated by the thumb-screw $f'$. The feed-shaft $e^3$ has firmly secured thereon the ratchet-wheel $g$ upon the side of its bearing opposite to the feed-roll $e'$, and also has loosely mounted thereon the two-armed lever $g'$ and the stop-arm $g^2$, so as to be freely movable about the axis of the shaft $e^3$, the one to intermittently move the feed-roll $e'$, for feeding the wire by the action of the pawl $h$, pivoted to one end thereof upon the ratchet-wheel $g$, and the other to determine and limit the backward movement of the pawl, and thus gage the length of wire to be fed at each intermittent movement of the feed-rolls. The free end of the arm $g^2$ is pivoted to the rod or bar F, which has adjustably secured to its lower end for the purpose of adjusting its position the sleeve $h'$, provided with the stud or pin $h^2$, which is fitted to a bearing in one end of the lever F', pivoted to the frame $A^3$ at $h^3$, and having pivoted to its other end the upper end of the connecting-rod $F^2$, the lower end of which is pivoted to the rear end of the treadle-lever $F^3$, which in turn is pivoted to the stand $F^4$, bolted to the under side of the base A, a spiral spring, $i$, surrounding said rod $F^2$ below the base A, the tension of which tends to force the rod $F^2$ downward when the foot of the operator is removed from the treadle-lever $F^3$. The bar F extends above the point of attachment of the stop-arm $g^2$, and has pivoted thereto the lever G, carrying at its upper end the anti-friction roll $i'$, mounted upon a stud set therein, upon which roll the cam $B^6$ acts to move said lever about its pivot, the opposite end of said lever resting against the lower or pendent arm of the pawl-lever $g'$, and serving to move said lever $g'$ about its axis in one direction, and to be moved in the opposite direction by the action of said lever $g'$ thereon, when the cam $B^6$ acts upon the anti-friction roll $i^2$, mounted upon a rearward extension of the pivot-pin, upon the front end of which are mounted the pawls $h$, for the purpose of moving said pawls and the ratchet-wheel about the axis of the shaft $e^2$ in the direction indicated by the arrow on Fig. 21. The stop-arm $g^2$ is provided with the laterally-projecting lug $j$, which engages with the edge of the pawl-lever $g'$, to limit its backward movement, or the movement in a direction the reverse of that indicated by the arrow on Fig. 21.

The length of wire to be fed, and consequently the length of the nail to be cut, is determined by the position of the lug $j$, which position is determined by the vertical movement and position of the bar F and the lever G, carried thereby. To control and regulate the vertical movement and position of said bar F the pivot-pin $j'$, by which the rod $F^2$ is connected to the lever $F'$, projects through said lever and from its inner surface in position to engage with one or the other of two scroll-like stop-cams, $k$ and $k'$, according as the operator's foot is placed upon or removed from the treadle $F^3$, as shown in Fig. 28. The cams $k$ and $k'$ are respectively mounted upon the short horizontal shafts $k^2$ and $k^3$, fitted to bearings in the frame $A^3$, and having secured to their other ends the radius-arms $l$ and $l'$, respectively, in the free end of each of which is fitted the locking-bolt $l^2$, having secured to its outer end the operating button or head $l^3$, by means of which said bolt may be drawn outward against the tension of the spiral spring $l^4$, which tends to force said bolt into any one of a series of holes, $l^5$, arranged in an arc of a circle about the axis of the shaft $k^2$ or $k^3$, all as shown in Figs. 2 and 28.

The operation of the wire-feeding mechanism is as follows: The coil of wire having been placed upon the reel, and the end of the wire having been passed down the channel $e$ until its end is inserted between the feed-rolls $e'$ and $e^2$, and the cams $k$ and $k'$ having been set as indicated in Fig. 3, if the operator places his foot upon the treadle $F^3$ and the driving-shaft is set in motion, a length of wire equal to the longest nail that can be cut and driven in the machine is fed. If it is desired to cut a slightly-shorter nail, the cam $k$ is turned in the direction of the arrow on Fig. 3, by withdrawing the locking-bolt in the radius-arm $l$, moving said arm in the direction indicated by the arrow on Fig. 2 until the bolt enters another hole $l^5$. The effect of this is to move the stop-lug $j$ in the direction indicated by the arrow on Fig. 21, by the upward movement of the bar F, thereby reducing the distance between said lug and the edge of the arm $g'$, and consequently the distance which said arm and its pawl can be moved in a backward direction to make a new engagement of said pawls with the ratchet-wheel $g$. If it is desired to feed a length of wire equal to the shortest nail to be cut, the operator removes his foot from the treadle $F^3$, when the rod $F^2$ will be forced downward by the spring $i$ until the inner end of the pin $j'$ comes in contact with the cam $k'$, said cam being in the position shown in Fig. 3, thereby reducing the space between the lug $j$ and the edge of the pawl-carrying arm of the lever $g'$, and consequently the movement of the feed-pawls, to a minimum. If it is desired to increase the length of the shortest nail to be cut and driven in a given job, the cam $k'$ is turned in the direction indicated by the arrow on Fig. 3 until the lug $j$ is adjusted to the proper point.

It will be seen from the foregoing that the machine is adapted to feed two different lengths of wire for nails to be driven into the fore part and shank of the shoe, respectively, the change being made from one length to the other by the operator simply putting his foot upon or removing it from the treadle $F^3$, and that the length of feed in either case may be readily changed by adjusting the cams $k$ and $k'$.

The machine, as shown in the drawings and herein described, is so arranged that the operator must keep his foot upon the treadle $F^3$, while driving the longer nail and remove it when the shorter nail is being driven; but it is obvious that this order may be reversed, if desired, without affecting the principles of my invention, by pivoting the treadle-lever $F^3$ at its rear end and connecting the rod $F^2$ to said treadle between its pivot and its free end, and arranging the spring $i$ so as to move the rod $F^2$ upward, instead of downward.

H is the die-holding block bolted to the under side of the front portion of the frame $A^3$, and provided in its upper face with the rectangular groove $m$, which extends from side to side thereof parallel with its front face, in which are fitted, so as to be adjusted lengthwise thereof, the cutting-dies $H'$ and $H^2$, said dies each being provided with an adjusting-screw, $m'$, tapped therein, and provided with a collar, $n$, fitted to revolve in vertical grooves $n'$, formed in the walls of the groove $m$, all as shown in Figs. 14, 15, and 16. The die-block H also has formed in its upper face another rectangular groove, $m^2$, extending from the center of the groove $m$ to the rear side of said block and at right angles to the groove $m$, to serve as a bearing and guide for the plunger I, having fixed in its forward end the steel male cutting-die $n^2$, as shown in Fig. 15.

The two dies $H'$ and $H^2$, when properly adjusted relative to each other, form the female cutting-die for shaping the sides of the nail in co-operation with the male-die $n^2$. The inner ends of the dies $H'$ and $H^2$ are slightly inclined to a perpendicular, said incline corresponding to the taper to be given to the sides of the nail. Said dies are also provided with vertical slots $o$, extending from their inner ends toward their outer ends and parallel with their front faces, the center line of said slots being in the same transverse plane as the center of the channel $e$, down which the wire is fed to the dies.

At the junction of the grooves $m$ and $m^2$ a circular recess is formed in the die-block H, to which is fitted the base-flange $o'$ of the bifurcated plate $o^2$, which projects upward into the slots $o$ of the dies H' and H², the space between the two parts of the plate $o^2$ being of suitable width to permit the free passage between them of the wire from which the nails are to be cut, and a hole of corresponding diameter is made through the base $o'$, through which the waste metal cut from the wire in shaping the nail may fall. A larger hole, $p$, is made through the lower portion of the die-block H for the same purpose, as shown in Figs. 11, 14, and 20.

The office of the bifurcated plate $o^2$ is to serve as side guides to the wire from which the nails are to be cut as it is fed downward, the two parts of such plate extending upward into the slots $o$, which slots extend longitudinally into the dies H' and H² to a considerable distance, as shown, for the purpose of enabling said dies to be sharpened by simply grinding their inner ends, and were it not that the plate $o^2$ is introduced there would be nothing to prevent the wire, when it is fed downward, from springing to one side or the other, so as to be improperly acted upon by the male cutting-die $n^2$. The die H² also has formed in its inner end the horizontal slot $o^3$, extending from the front to the rear side thereof, and the inner end of the stock of said die which is above said slot being inclined to a perpendicular plane in a direction opposite to the portion below said slot, as shown in Fig. 14.

The dies here described are designed to cut the nail which is described in Letters Patent No. 335,563, granted to me February 9, 1886, the upper surface, $h^4$, of the die H' being designed to cut the shoulder $c$ under the head of said nail, the surface which forms the under side of the slot $o^3$ of the die H² to cut the shoulder $c'$, and the portion of said die above the slot $o^3$ to cut the notch $d$ in the head of said nail.

The front wall of the groove $m$ has formed therein a vertical groove, $o^4$, of a capacity sufficient to receive the nail after it is cut from the wire, said groove being directly beneath the driver $d$ and in line with the hole $o^5$ through the nose I', which rests upon the shoe-sole when the nails are being driven.

Directly above the groove $m^2$ and the plunger I, and fitted to a rectangular groove formed in the under side of the front portion of the frame $A^3$, is the block J, in which is set the steel bushing $p'$, secured in the desired position by the wedge or key $o^6$, the lower end of which, acting in conjunction with the upper front corner of the male die $n^2$, serves to sever the desired length of wire from the main body thereof to form a nail, said block also having formed in its forward end a hole to serve as a guide for the driver $d$, as shown in Fig. 10. The rear end of the plunger I is pivoted at $p^2$ to the lever J', mounted upon the pin $h^3$, and adjustably connected at its upper end to the arm J² (mounted upon the same pin) by means of the screw-bolt $p^4$ and the threaded ear $p^5$ on the arm J², as shown in Figs. 26 and 27. The arm J² has set in its free end a stud, $q$, upon which is mounted an anti-friction roll, $q'$, which fits into and is acted upon by the path $d'$ of the cam B⁵, to vibrate the duplex lever J' J² and impart to the plunger I and male cutting-die $n^2$ a reciprocating motion, for the purpose of cutting a nail from the wire and feeding it beneath the driver $d$.

The lever J J² is made in two parts and provided with the adjusting-screw $p^4$, for the purpose of adjusting the male cutting-die $n^2$, to compensate for grinding its front end to keep it in good cutting condition, and also to compensate for the wear of the cam-path $d'$ and the roll $q'$.

To the under side of the die-block H is pivoted the lever K, carrying at its front end the roll or truck $r$, mounted upon a stud set in the end of said lever and arranged to rest upon the sole of the boot or shoe being nailed, in close proximity to the nose I', said lever having formed upon the under side of its rearwardly-projecting arm a cam-surface, $r'$, with which the anti-friction roll $r^2$, mounted upon a pin in the lower end of the bifurcated arm of the lever J', engages to control the position of said lever and the roll or truck $r$—that is, while the nail is being driven the lever J' J² remains in the position shown in Figs. 1 and 2, and the bottom edge of the truck $r$ is flush with the lower end of the nose I'; but when the nail is driven, and it is desired to feed the shoe preparatory to driving another nail, the lever J' J² is vibrated or moved about its pivot to retract the male cutting-die $n^2$ to such a position that the wire may be fed downward in front thereof, during which movement of the lever J' J² the roll $r^2$, acting upon the inclined cam-surface $r'$ of the lever K, raises the rear end of said lever and depresses its front end with the truck $r$, thereby forcing the shoe-sole away from the nose I', in which position it is held while the shoe is being fed forward to the proper position for driving the next nail, thus relieving the shoe-sole from the friction of the stationary nose, and substituting therefor the rolling surface of the truck $r$, the shoe-supporting horn L being automatically moved downward at the same time that the shoe is moved away from the nose I' by the same means that moves the shoe away from the nose.

To the under side of the lever K, and just in the rear of the truck $r$, is fitted, so as to be movable endwise thereon, the gage $r^4$, provided upon its upper side with lips $ss$, to embrace the sides of said lever and guide it in its endwise movements, and having formed in its under side a transverse rectangular groove to receive the cam-like end of the adjusting and locking lever K', pivoted to the upper surface of the forward portion of the cap K², adjustably secured to the under side of said lever K, so that the gage may be set to a greater or less distance from the orifice in the nose, all as shown in Figs. 10, 11, 12, and 13. This gage is used to guide the sole of the boot or shoe and determine the distance of the row of nails from its edge, said gage being adjusted to the position shown in Figs. 11 and 13, when only a single row of nailing is to be used; but if a second row is desired, the lever K' is turned into the position shown in Fig. 12, when the gage is retracted and locked in the desired position for gaging the second row of nails. The lever K' is provided with the shoulders $s'$ and $s^2$, which engage, respectively, with the front or rear wall of the groove in the under side of the gage, as shown in Figs. 12 and 13, so as to prevent any movement of the gage until the lever K' is moved.

L is the shoe-supporting horn, pivoted by the pin $s^3$ to the bracket L', and locked in a vertical position by the spring-pressed locking-bolt $s^4$ in such a manner that by retracting said locking-bolt the horn may be moved about its pivot-pin whenever it is desired to remove the die-block or the driver, or for any other purpose. The bracket L' is mounted upon the upper end of the supporting-rod $L^2$ in such a manner that it may be freely revolved about the axis of said rod. The rod $L^2$ is mounted in bearings M' and $M^2$ on the bar or frame M, and is provided with a collar, $L^3$, to limit its upward movement, and is surrounded between said collar and the bearing $M^2$ with the spiral spring $L^4$, which serves to maintain said collar $L^3$ in contact with the under side of the bearing M' when the work is removed from the horn, or the sole of the shoe when placed upon the horn in contact with the end of the nose I'. The lower end of the rod $L^2$ is slotted to receive the upper end of the link $L^5$, which is pivoted thereto, the opposite end of said link being pivoted to the treadle-lever N, which in turn is pivoted by its rear end to the rear leg of the machine, as shown in Figs. 1 and 4, and by means of which the horn L may be depressed, if desired. The bar or frame M is pivoted at its upper end to the front of the column $A^2$ by means of a hollow or tubular bolt, $t$, and nut $t'$, as shown in Fig. 6, and has formed in its lower end the open slot $t^2$, the sides of which engage with the sides of a rectangular projection from the rear of the bifurcated collar $L^6$, which is clamped to the rod $L^2$ near its lower end, for the purpose of preventing the rod $L^2$ from turning about its axis. The collar $L^6$ also has formed thereon or set therein the rearwardly-projecting pin $l^3$, by means of which the arm N' is pivoted to said collar, said arm N' having its upper end slotted or forked and located between two rearwardly-projecting ears, $u$ $u'$, formed on the lower end of the frame M, in which are set the adjustable stop-screws $u^2$ and $u^3$, for the purpose of limiting and regulating the amount of movement that may be imparted to the arm N', independent of the movement of the frame M, all as shown in Figs. 33 and 35. A horizontal shaft, O, is mounted in bearings in the standard or column $A^2$, to which rotary motion is imparted by means of the bevel gear-wheels O' and $O^2$, the shaft $O^3$, the worm-wheel $O^4$, and the worm $O^5$, all as shown in Figs. 3, 4, 5, and 31. The shaft O has formed upon or set in its front end the three-sided pin $v$, which is located eccentric to the axis of the shaft O, and projects into the slot formed in the upper end of the arm N', so that as the shaft O is revolved in the direction indicated by the arrows on Figs. 33 and 34 the pin $v$ will successively act upon the straight side, the curved side, and the bottom of the slot formed in the upper end of the arm N'.

The operation of the shoe-feeding mechanism is as follows: The shoe being placed upon the horn in the proper position to drive the first nail, and held by the operator's hand, and the cam-shaft being set in motion, a nail is cut and driven. When the male cutting-die is retracted to a position to permit another downward movement of the wire, the boot or shoe is forced away from the nose, and the horn upon which the sole of the boot or shoe rests is depressed by the action of the roll $r^2$ upon the inclined cam-surface $r'$ of the lever K, at which time the triangular or three-sided pin $v$ engages with the curved side of the slot formed in the upper end of the arm N' and moves said arm around its pivot until it strikes the screw-stop $u^2$, and then moves the frame M about its pivot, its lower end moving to the right and the tip of the horn moving to the left, and carrying the shoe with it a distance equal to the desired distance between two nails, when said three-sided pin $v$ engages with the bottom of said slot and moves the arm N', the rod $L^2$, and the horn L downward, so as to remove the tip of the horn from contact with the boot or shoe sole, the operator holding the boot or shoe up in contact with the roll $r$, and then the pin $v$, coming in contact with the straight side of the slot in the arm N', moves said arm into contact with the stop-screw $u^3$, and then moves the frame M, rod $L^2$, and the horn L into their normal or upright positions, and as the pin $v$ moves away from the bottom of the slot in the arm N' the spring $L^4$ expands and moves said rod $L^2$ and the horn L upward until the tip of the horn comes in contact with the inner surface of the sole and clamps said sole between the tip of the horn and the nose I', the roll $r$ having been moved upward into its normal position by the forward movement of the lower end of the lever J', releasing the long arm of the lever K, and permitting said arm to fall into the position shown in Fig. 2.

To prevent the horn from yielding to the pressure of the driver while a nail is being driven into the boot or shoe sole, the horn-supporting rod $L^2$ is clamped firmly to its upper bearing by the shoe $v'$, curved to fit the periphery of said rod and secured to the end of the plunger $v^2$, having its bearing in the tubular bolt $t$, and having mounted thereon the spiral spring $v^3$, between a shoulder on said plunger and a shoulder formed in said tubular bolt, said spring serving to retract the shoe $v'$ from the rod $L^2$. The shoe $v'$ is forced into contact with the rod L² at the desired time in the operations of the machine by the action of the cam P upon the rod P', the upper end of which is pivoted to the toggle-links v⁴ and v⁵, interposed between the rear end of said plunger and the upper end of the lever v⁶, and is forced downward or held in contact with said cam by the spring v⁵, set in a recess in the column A², as shown in Figs. 6, 9, and 36. The lever v⁶ is pivoted at v⁷ to the standard or column A², with its long arm depending from said pivot, and has set therein the adjusting-screw w, the inner end of which engages with the conical-pointed rear end of the plunger w', fitted to a cylindrical chamber formed in said column, within which is placed the spiral spring w², the tension of which determines the amount of pressure which can be applied to the rod L² by the shoe v', and the tension of said spring may be increased or diminished by turning the screw w. A stud, w³, is set in the rear side of the column A², and is provided at its outer end with the adjustable stop-nut w⁴, to limit the outward movement of the forked lower end of the lever v⁶, which embraces the stud w³, and with the check-nut w⁵, as shown in Fig. 6.

To prevent the driving-shaft being revolved in the wrong direction, the rear end of the cam B⁵ is chambered out to receive the hub A⁵ of the frame A³, which has a portion of one side cut away to form an eccentric or cam surface, w⁶, terminating at one end in the abutment w⁷, as shown in Fig. 24. The inner periphery of the chambered end of the cam B⁵ has formed therein the circumferential groove w⁸, having a curved cross-section to fit the periphery of the ball x, which, when the machine is at rest, rests in said groove with its opposite side in contact with the eccentric surface w⁶, as shown in Figs. 24 and 25. If the shaft B is revolved in the direction indicated by the arrow on Fig. 24, the ball x will be moved slightly toward the abutment w⁷, and present no obstacle to the revolution of said shaft; but if an attempt be made to revolve the shaft in the opposite direction the ball x will be moved in the opposite direction and wedged firmly between the bottom of the groove w⁸ and the surface w⁶, thereby rendering further motion of the shaft in that direction impossible.

It is obvious that the distance apart at which the nails shall be driven may be varied by turning the stop-screw w³, if it is desired to increase the distance between the nails, or out, if a less distance is desired. It will also be obvious upon examination that the tubular cutting-die p' may be sharpened by grinding its lower end, and that it may be readily adjusted lengthwise to compensate for such grinding, or about its axis to bring another part of its cutting-corner into position to do the cutting, by means of the clamping-wedge o⁶, as shown in Figs. 37 and 38.

The spindle D', upon which is mounted the wire-carrying reel or drum D², has fitted thereon the spiral spring y and the nuts y' and y², by which said spring is forced against the end of the hub of the reel and its tension regulated, for the purpose of checking or regulating the rotation of said reel.

What I claim as new, and desire to secure by Letters Patent of the United States, is—

1. In a machine for driving nails, the combination of the vertically-reciprocating plunger E, carrying in its lower end the driver d, the toggle-links E' and E², the link E³, the bar E⁴, provided with the roll b', and the cam B⁵, all arranged and adapted to operate substantially as described.

2. The combination of the die-block H, provided with the rectangular grooves m and m², a pair of cutting-dies located in said groove m, and constructed and arranged to be adjusted toward and from each other and to be sharpened by grinding their inner or contiguous ends, and a reciprocating male die carried by a plunger mounted in the groove m², and constructed to co-operate with the first-mentioned dies to sever portions of metal from each side of the wire to shape the sides of the nail.

3. The combination of the adjustable dies H' H², the stationary tubular die p', and the reciprocating male cutting-die n², all constructed, arranged, and adapted to cut away portions of the metal from each side of the wire to shape the sides of the nail, and to sever the nail from the body of the wire.

4. The combination of the cylindrical tubular die p', set in a cylindrical socket, and the wedge or key o⁶, fitted to and movable in a bearing at right angles to the die p', and adapted to clamp said die to its socket in any desired position.

5. In combination with the adjustable dies H' H², each provided with the vertical slot o, the bifurcated plate o², projecting into said slots o, substantially as and for the purposes described.

6. The combination of the die-block H, provided with the grooves m and n' n', the dies H' and H², fitted to said groove m, and the adjusting-screws m' m', each provided with the collar n, which projects into and engages with the grooves n' n', substantially as described.

7. The combination of the die-block H, the adjustable cutting-dies H' H², each provided with the vertical slot o, the bifurcated plate o², the tubular die p', and the reciprocating male cutting-die n², all arranged and adapted to operate substantially as described.

8. The combination of the die-block H, provided with the nail-driving passage o⁴ o⁵, the adjustable dies H' H², the tubular die p', the plunger I, carrying the male cutting-die n², the duplex lever J' J², provided with the adjusting-screw p⁴, and the cam B⁵, all arranged and adapted to operate substantially as described.

9. In a machine for cutting nails from wire and driving the same, the combination of a pair of feed-rolls arranged to grip the wire, a ratchet-wheel secured upon a feed-roll shaft, a two-armed lever carrying at the free end of one arm a pawl to engage with said ratchet-wheel, and mounted upon and movable about said feed-roll shaft, a second two-armed lever mounted upon and movable about an axis outside of or eccentric to said feed-shaft, and arranged to bear at one end upon the arm of the pawl-lever opposite to the pawl, and a cam constructed and arranged to act upon the pawl-lever to impart a partial revolution to the ratchet, its shaft, and feed-roll, and then, during the same revolution, to act upon the second lever, to move it about its pivot, and through it to move the pawl-lever in a backward direction preparatory to the arrangement of the pawl with another tooth of the ratchet-wheel for a second feed, substantially as described.

10. As a means of regulating the length of wire to be fed, the combination of a pair of feed-rolls constructed and arranged to grip the wire to be fed, a ratchet-wheel secured upon a feed-roll shaft, a two-armed lever mounted upon and movable about said shaft, and carrying at one end a pawl to engage with said ratchet-wheel, an arm provided with a laterally-projecting stop-lug, and also mounted upon and movable about said shaft, a vertically-movable bar pivoted to the free end of said stop-arm, a spring for moving said bar upward, and an adjustable cam-stop for limiting and varying the upward movement of said bar, a two-armed lever pivoted to said bar with one end in contact with the toe of the pawl-lever, and a cam constructed and arranged to act alternately upon the pawl-lever to feed the wire and upon the last-mentioned two-armed lever to move said pawl-lever backward into contact with the stop-lug, substantially as described.

11. The combination of the feed-rolls $e'$ $e^2$, the feed-shaft $e^3$, the ratchet-wheel $g$, the pawl-lever $g'$, the pawl $h$, the bar F, the lever G, pivoted to said bar F, the anti-friction rolls $i'$ and $i^2$, the cam $B^6$, the lever F', the rod $F^2$, the treadle $F^3$, the spring $i$, the stop-cams $k$ and $k'$, the shafts $k^2$ and $k^3$, the radius-arms $l$ and $l'$, the locking-bolts $l^2$ $l^2$, and two series of detent-holes, $l^5$, arranged in arcs of circles about the axis of the shafts $k^2$ and $k^3$, all constructed, arranged, and adapted to operate substantially as and for the purpose described.

12. In combination with the yielding horn L and the stationary nose I', the lever K, provided with the cam-surface $r'$, and carrying at its front end the roll $r$, the lever J' $J^2$, and the cam $B^5$, all arranged and adapted to force the boot or shoe mounted upon the horn away from contact with the nose preparatory to feeding the boot or shoe to a position for feeding another nail.

13. In a shoe-nailing machine, the combination of the gage $r^4$, provided with a transverse groove, the stationary cap $K^2$, and the adjusting and locking lever K', all arranged and adapted to operate substantially as described.

14. In a nail cutting and driving machine, the combination of a reciprocating die for cutting the nail from the wire, a reciprocating plunger and driver for driving the nail, a lever carrying a rotatable presser-roll for forcing the shoe-sole away from the nose of the machine, a lever constructed and arranged to reciprocate the cutting-die and vibrate the presser-roll-carrying lever, a reciprocating bar, and suitable toggle-links connecting the same with the nail-driving plunger, and a cylindrical path-cam constructed and arranged to operate all of said devices, substantially as described.

15. The horn L, pivoted to the bracket L', loosely mounted upon the rod $L^2$, in combination with the locking-bolt $s^4$, constructed and adapted to secure said horn in an upright position and permit its being turned down to a horizontal position, substantially as described.

16. The combination, in a nail cutting and driving machine, of a work-supporting horn mounted upon a pivoted frame, and a three-sided crank-pin for imparting to said horn and frame an oscillating motion about its pivot and depressing said horn and rod, substantially as described, for the purposes specified.

17. The combination of the frame M, the rod $L^2$, the spring $L^4$, the horn L, the forked arm N', pivoted to the rod $L^2$, the three-sided crank-pin $v$, the adjustable stop-screws $v^2$ $v^3$, and the revolving shaft O, all constructed, arranged, and adapted to operate substantially as and for the purposes described.

18. A work-supporting horn mounted upon a yielding support having bearings in a pivoted frame, as set forth, in combination with mechanism, substantially as described, for imparting to said frame and horn a vertical and a lateral motion, substantially as and for the purposes described.

19. In combination with a work-supporting horn mounted upon a yielding and vertically-movable rod, a friction clamping-shoe arranged to press against the periphery of said rod to clamp it in any desired position, and mechanism constructed and arranged to intermittently reciprocate said shoe in a direction at right angles to the axis of said horn-supporting rod.

20. The combination of the frame M, mounted upon and movable about a horizontal tubular pivot, the horn-supporting spindle L, mounted in bearings on said frame, the spring $L^4$, the friction clamping-plunger $v'$ $v^2$, mounted in said tubular pivot, and mechanism for imparting to said clamping-plunger a reciprocating motion, substantially as described.

21. The combination of the horn L, the rod $L^2$, the spring $L^4$, the frame M, mounted upon the fixed tubular pivot $t$, the clamping-plunger $v'$ $v^2$, the toggle-links $v^4$ $v^5$, the bar P', and the cam P, all arranged and adapted to operate substantially as described.

22. The combination of the horn L, the supporting-rod $L^2$, the spring $L^4$, the frame M, the pivot-bolt $t$, the clamping-plunger $v'$ $v^2$, the toggle-links $v^4$ $v^5$, the lever $v^6$, the adjusting-screw $w$, the plunger $w'$, the spring $w^2$, the stop $w^4$, the cam P, and the rod or bar P', all arranged and adapted to operate substantially as and for the purposes described.

23. In a machine for cutting nails from a continuous wire and driving the same, a reel or drum for carrying the coil of wire, having a detachable head secured in position by a threaded thumb-nut, and provided with a central oblong opening of a shape and size to permit the free passage of said thumb-nut through the same when turned to a certain position, and allow the wings of said nut to bear upon said head to clamp it to the drum when said nut is turned a quarter of a revolution or less from said other position, substantially as described.

24. In combination with a nail driving and severing mechanism, the driving-shaft B, a recessed hub secured firmly upon said shaft and provided in its inner periphery with the circumferential groove $w^5$, the stationary hub $A^5$, provided with the eccentric surface $w^6$ and the abutment $w^7$, and the ball $x$, all arranged and adapted to operate substantially as and for the purposes described.

In testimony whereof I have signed my name to this specification, in the presence of two subscribing witnesses, on this 13th day of February, A. D. 1886.

ORRIL R. CHAPLIN.

Witnesses:
N. C. LOMBARD,
WALTER E. LOMBARD.